J. J. B. ARTER.
FLASH LAMP.
APPLICATION FILED JULY 6, 1918.
1,291,710.
Patented Jan. 21, 1919.
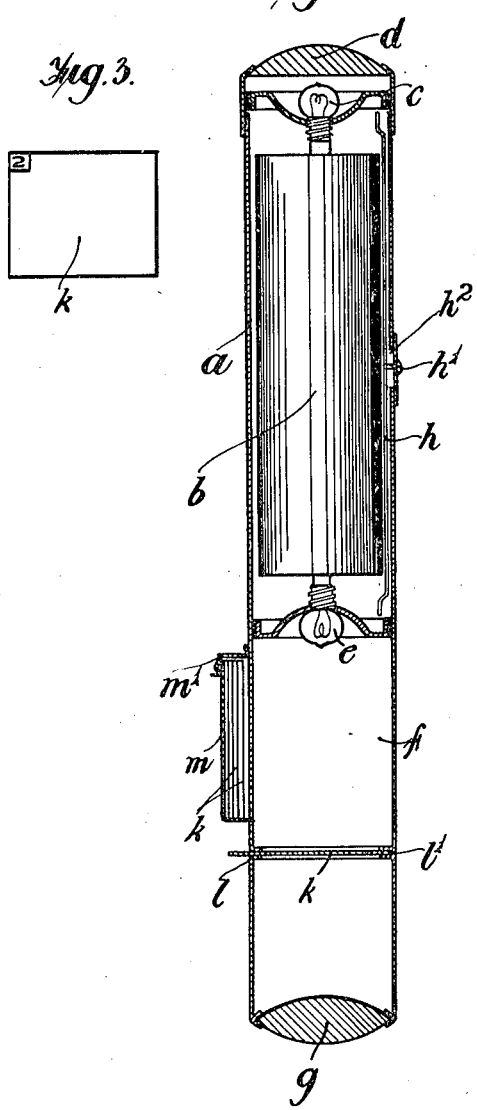
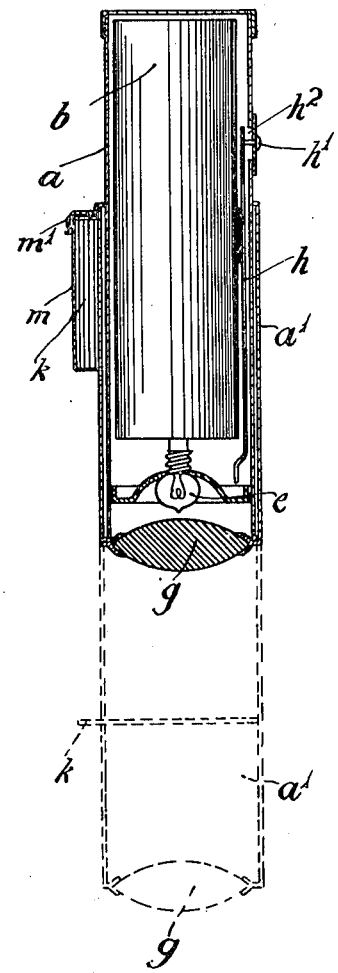
INVENTOR:
JOHN J. B. ARTER
ATTORNEY.

UNITED STATES PATENT OFFICE.

JOHN J. B. ARTER, OF GREET, NEAR BIRMINGHAM, ENGLAND.

FLASH-LAMP.

1,291,710.	Specification of Letters Patent.	Patented Jan. 21, 1919.

Application filed July 6, 1918. Serial No. 243,614.

*To all whom it may concern:*

Be it known that I, JOHN JAMES BEDNEY ARTER, subject of the King of Great Britain, residing at James Works, Greet, near Birmingham, in the county of Warwick, England, have invented a new and useful Flash-Lamp; and I do hereby declare the following to be a full, clear, and exact description of the same.

My invention comprises improvements in or relating to flash lamps and has for its object to adapt them so that they may carry a map in such manner that it is not exposed to the weather, such flash lamps being particularly intended for use for war purposes, though they may be usefully employed by motorists and for other purposes.

Another object of my invention is to provide means whereby miniature semi-transparent maps may be inserted into the lamp between the light and a magnifying lens whereby the maps may be viewed by the aid of the light through the magnifying lens.

The accompanying drawings illustrate two forms of flash lamp constructed in accordance with my invention.

Figure 1 shows a torch having two lamps, one of which is used for ordinary illuminating purposes and the other for map reading.

Fig. 2 shows a form of torch in which the lamp can be used either for ordinary illuminating purposes or for map reading.

Fig. 3 is a plan view of a map slide.

In Fig. 1 a lamp $a$ of the "torch" pattern is shown and it is arranged with a single battery $b$ with ordinary lamp $c$ and lens $d$ at the one end, while at the opposite end of the battery $b$ a second lamp $e$ is located behind a map carrier $f$ and the map reading and magnifying lens $g$ at the extreme end. The lamps $c$ and $e$ are controlled by a three-position switch $h$, adapted to switch on the flash lamp $c$, or the map reading lamp $e$, or it may be in a neutral position in which neither lamp is on.

The switch is of the usual construction but is double ended and it consists of a strip of metal $h$ slidably mounted on the inside of the lamp casing and operated from the outside thereof by a member $h^1$ which moves in a slot $h^2$ in the lamp casing. One end of the strip $h$ is adapted to make contact between the lamp casing and the diaphragm which carries the lamp $c$, and the other end of the strip $h$ is adapted to make contact between the lamp casing and the diaphragm which carries the lamp $e$.

The maps $k$ are of miniature form and of rectangular or other suitable shape. They are adapted to be inserted through a slotted opening $l$ at one side of the lamp and into suitable guides $l^1$, while a receptacle $m$ is provided upon one side of the lamp body for carrying spare maps.

This receptacle $m$ may have a movable lid $m^1$ to allow of access being obtained to the maps. That portion of the lamp which is to accommodate the maps is shaped in cross section similarly to the shape of the maps.

In the lamp shown in Fig. 2 the same lens $g$ and lamp $e$ are employed both for map reading and ordinary illuminating purposes, in which case the absence of the map would permit it to be used for illuminating purposes. In this case the end of the torch may be made telescopic as shown at $a^1$ to enable the required focus to be obtained.

It will be understood that the invention may be applied to lamps of more or less rectangular form, in which the lens is carried upon the flat side of the body.

What I claim then is:—

1. A flash lamp having in combination a lamp body; a battery; a lamp within said lamp body; a switch to control said lamp; a magnifying lens spaced apart from said lamp; and means intermediate of said lamp and the lens for carrying a map.

2. A flash lamp having in combination a lamp body; a battery; a lamp within said lamp body; a switch to control said lamp; a magnifying lens spaced apart from said lamp; means intermediate of said lamp and the lens for carrying a map; and a receptacle for carrying a plurality of maps.

3. A flash lamp having in combination a lamp body; a battery; lamps within said lamp body on opposite sides of the battery; a switch to control said lamps; a lens adjacent to one lamp; a magnifying lens spaced apart from the other lamp; and means intermediate of said lamp and lens for carrying a map.

4. A flash lamp having in combination a lamp body; a battery; lamps within said lamp body on opposite sides of the battery; a switch to control said lamps; a lens adjacent to one lamp; a magnifying lens spaced apart from the other lamp; means intermediate of said lamp and lens for carrying a map; and a receptacle for carrying a plurality of maps.

5. A flash lamp having in combination a lamp body; a battery; a lamp within said lamp body; a switch to control said lamp; a magnifying lens spaced apart from said lamp; and means intermediate of said lamp and the lens for carrying a map, said lens and means being carried by a portion of the lamp body which is adjustable to and from said lamp.

6. A flash lamp having in combination a lamp body; a battery; a lamp within said lamp body; a switch to control said lamp; a magnifying lens spaced apart from said lamp; means intermediate of said lamp and the lens for carrying a map, said lens and means being carried by a portion of the lamp body which is adjustable to and from said lamp; and a receptacle for carrying a plurality of maps.

7. A flash lamp having in combination a lamp body; a battery; lamps within said lamp body on opposite sides of the battery; a switch to control said lamps; a lens adjacent to one lamp; a magnifying lens spaced apart from the other lamp; and means intermediate of said lamp and lens for carrying a map, said lens and means being carried by a portion of the lamp body which is adjustable to and from said lamp.

8. A flash lamp having in combination a lamp body; a battery; lamps within said lamp body on opposite sides of the battery; a switch to control said lamps; a lens adjacent to one lamp; a magnifying lens spaced apart from the other lamp; means intermediate of said lamp and lens for carrying a map, said lens and means being carried by a portion of the lamp body which is adjustable to and from said lamp; and a receptacle for carrying a plurality of maps.

In testimony whereof, I have signed my name to this specification.

JOHN J. B. ARTER.